US010350820B2

(12) United States Patent
Chen et al.

(10) Patent No.: US 10,350,820 B2
(45) Date of Patent: Jul. 16, 2019

(54) REMOTE OPERATIONS OF ADDITIVE MANUFACTURING DEVICES (71) Applicant: Made in Space, Inc., Moffett Field, CA (US)

(72) Inventors: Michael Chen, Mountain View, CA (US); Michael Snyder, Mountain View, CA (US); Jason Dunn, Mountain View, CA (US); Aaron Kemmer, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 324 days.

(21) Appl. No.: 14/520,154

(22) Filed: Oct. 21, 2014

(65) Prior Publication Data
US 2015/0112472 A1 Apr. 23, 2015

Related U.S. Application Data (63) Continuation-in-part of application No. 14/331,729, filed on Jul. 15, 2014.
(Continued)

(51) Int. Cl.
B29C 64/20 (2017.01)
B29C 64/106 (2017.01)
(Continued)

(52) U.S. Cl.
CPC .......... B29C 64/106 (2017.08); B29C 64/141 (2017.08); B29C 64/20 (2017.08);
(Continued)

(58) Field of Classification Search
CPC ............ B29C 67/0085; B29C 67/0081; B29C 67/0059; B22D 11/10; B22D 11/01;
(Continued)

(56) References Cited

U.S. PATENT DOCUMENTS 3,534,926 A 10/1970 Wuenscher
3,583,467 A 6/1971 Bennett et al.
(Continued)

FOREIGN PATENT DOCUMENTS

DE 10335735 2/2005
EP 2727709 5/2017
(Continued)

OTHER PUBLICATIONS

Dunn et al., "3D Printing in Space: Enabling New Markets and Accelerating the Growth of Orbital Infrastructure", Space Studies Institute Oct. 29-31, 2010.*
(Continued)

Primary Examiner — Carlos R Ortiz Rodriguez
(74) Attorney, Agent, or Firm — Terry M. Sanks, Esq.; Beusse Wolter Sanks & Maire, PLLC (57) ABSTRACT Node-based remote operations of additive manufacturing device are disclosed. In an aspect, a system for operating a remote additive manufacturing device is disclosed. Each computing device is a node in a communications path and contains an instance of a command software program configured to receive and send a single set of commands, ensure the integrity of such commands and/or operate communicatively connected additive manufacturing devices.

21 Claims, 9 Drawing Sheets

Related U.S. Application Data (60) Provisional application No. 61/893,286, filed on Oct. 21, 2013.

(51) Int. Cl.

| | | |
|---|---|---|
| *B29C 64/141* | (2017.01) | |
| *B29C 64/386* | (2017.01) | |
| *B33Y 10/00* | (2015.01) | |
| *B33Y 30/00* | (2015.01) | |
| *B33Y 50/02* | (2015.01) | |
| *B33Y 40/00* | (2015.01) | |

(52) U.S. Cl.
CPC ............ *B29C 64/386* (2017.08); *B33Y 10/00* (2014.12); *B33Y 30/00* (2014.12); *B33Y 40/00* (2014.12); *B33Y 50/02* (2014.12)

(58) Field of Classification Search
CPC .... B22D 11/16; B01D 46/444; B01D 46/448; B01D 45/14; B01D 50/002; B01D 46/0032; B01D 46/46; B01D 46/442; H04L 67/10
See application file for complete search history.

(56) References Cited

U.S. PATENT DOCUMENTS

| | | | |
|---|---|---|---|
| 4,439,979 A | 4/1984 | Winkelmann | |
| 4,753,730 A | 6/1988 | Maurer | |
| 5,259,436 A | 11/1993 | Yun et al. | |
| 5,303,141 A | 4/1994 | Batchelder et al. | |
| 5,541,802 A | 7/1996 | Bodahl-Johnsen | |
| 5,562,150 A | 10/1996 | Shimmell | |
| 5,920,483 A | 7/1999 | Greenwood et al. | |
| 6,004,124 A | 12/1999 | Swanson et al. | |
| 6,135,880 A | 10/2000 | Ho et al. | |
| 6,143,378 A | 11/2000 | Harwell et al. | |
| 6,431,975 B1 | 8/2002 | Ryan | |
| 6,575,548 B1 | 6/2003 | Corrigan et al. | |
| 6,758,876 B2 | 7/2004 | Suzuki et al. | |
| 6,772,026 B2 * | 8/2004 | Bradbury ............... G06Q 50/22 607/1 |
| 7,045,738 B1 | 5/2006 | Kovacevic et al. | |
| 7,168,935 B1 | 1/2007 | Taminger et al. | |
| 8,342,229 B1 | 1/2013 | Ziani et al. | |
| 8,794,263 B2 | 8/2014 | Scott et al. | |
| 8,983,957 B2 | 3/2015 | Rathod | |
| 2001/0030383 A1 | 10/2001 | Swanson et al. | |
| 2003/0230393 A1 | 12/2003 | Kimura et al. | |
| 2003/0235635 A1 | 12/2003 | Fong et al. | |
| 2004/0003738 A1 * | 1/2004 | Imiolek ................ B22F 3/1055 101/480 |
| 2004/0035542 A1 | 2/2004 | Ederer et al. | |
| 2004/0145629 A1 | 7/2004 | Silverbrook | |
| 2005/0133653 A1 | 6/2005 | Heaney et al. | |
| 2005/0194401 A1 | 9/2005 | Khoshnevis | |
| 2005/0271414 A1 | 12/2005 | Katayama et al. | |
| 2006/0156978 A1 | 7/2006 | Lipson et al. | |
| 2007/0267165 A1 | 11/2007 | Monteiro et al. | |
| 2008/0136066 A1 | 6/2008 | Taylor et al. | |
| 2008/0150192 A1 | 6/2008 | Perret et al. | |
| 2009/0011066 A1 | 1/2009 | Davidson et al. | |
| 2009/0076643 A1 | 3/2009 | Silverbrook | |
| 2009/0177309 A1 | 7/2009 | Kozlak | |
| 2009/0208577 A1 | 8/2009 | Xu et al. | |
| 2009/0252925 A1 | 10/2009 | Provoost et al. | |
| 2009/0267269 A1 | 10/2009 | Lim et al. | |
| 2011/0030557 A1 | 2/2011 | Brownstein et al. | |
| 2012/0113473 A1 | 5/2012 | Pettis | |
| 2012/0158903 A1 * | 6/2012 | Falk ..................... H04W 12/10 709/217 |
| 2013/0209600 A1 | 8/2013 | Tow | |
| 2014/0020192 A1 | 1/2014 | Jones et al. | |
| 2014/0085620 A1 * | 3/2014 | Lobovsky ........... G03F 7/70775 355/72 |
| 2014/0252668 A1 | 9/2014 | Austin et al. | |
| 2014/0268604 A1 | 9/2014 | Wicker et al. | |
| 2014/0277659 A1 | 9/2014 | Kumar et al. | |
| 2014/0316546 A1 | 10/2014 | Walsh et al. | |
| 2015/0104802 A1 | 4/2015 | Reep et al. | |
| 2015/0108687 A1 | 4/2015 | Snyder et al. | |
| 2015/0165693 A1 | 6/2015 | Sagoo et al. | |
| 2015/0209978 A1 | 7/2015 | Snyder et al. | |
| 2016/0001364 A1 | 1/2016 | Mironets et al. | |
| 2016/0067919 A1 | 3/2016 | Hoyt et al. | |
| 2016/0082652 A1 | 3/2016 | Snyder et al. | |
| 2016/0167254 A1 | 6/2016 | Cushing et al. | |
| 2016/0184893 A1 | 6/2016 | Dave et al. | |
| 2016/0207262 A1 | 7/2016 | Trowbridge | |
| 2016/0214175 A1 | 7/2016 | Nordstrom | |
| 2016/0243759 A1 | 8/2016 | Snyder et al. | |
| 2017/0038342 A1 | 2/2017 | Clavette et al. | |

FOREIGN PATENT DOCUMENTS

| | | |
|---|---|---|
| JP | 2009013395 | 1/2009 |
| WO | 2014070007 | 5/2014 |
| WO | 2014/144098 | 9/2014 |
| WO | 2015066607 | 5/2015 |

OTHER PUBLICATIONS

Gaerisl, "Fume Chamber (Negative-Pressure, Activated Carbon Filtering)," https://www.thingiverse.com/thing:13851, Nov. 23, 2011.

O'Connell, Frank, "A Machine that Gives Shape to Your Ideas," https://archive.nytimes.com/www.nytimes.com/interactive/2011/06/15/technology/personaltech/20110915-BASICS.html?_r=0, Sep. 14, 2011.

LeftAngle, "Injection Printing—Injection Molding on Your 3D Printer," Thingiverse, https://www.thingiverse.com/thing:82666, May 1, 2013.

LeftAngle, "Extreme High Definition Parts on Your 3D Printer," https://www.thingiverse.com/thing:83805, May 4, 2013.

\* cited by examiner

REMOTE OPERATIONS OF ADDITIVE MANUFACTURING DEVICES

CROSS REFERENCE TO RELATED APPLICATIONS

This application claims the benefit of Applicant's co-pending U.S. Non-Provisional patent application Ser. No. 14/331,729, filed Jul. 15, 2014 and entitled "Manufacturing in Microgravity and Varying External Force Environments" and U.S. Provisional Patent Application No. 61/893,286, filed Oct. 21, 2013, and entitled "Additive Manufacturing Devices Configured For Various Environments," the entire contents of each of which are incorporated herein by reference.

FIELD OF THE DISCLOSURE

The present disclosure generally relates to manufacturing control, and more particularly to remote operation of additive manufacturing devices.

BACKGROUND

Additive manufacturing techniques enable the rapid creation of objects, structures, portions thereof, prototypes, replacement parts, experimental parts, and make-shift items. Additive manufacturing devices may produce parts via additive processes. That is, material is sequentially bonded or otherwise mechanically or chemically joined together in order to form the desired object. One class of additive manufacturing devices, fused deposition modeling (FDM) devices, utilize a source of thermoplastics to produce parts. An extrusion nozzle is positioned and heated to a temperature that will melt supplied thermoplastic. Thermoplastic is fed through the nozzle, thereby depositing a desired amount of molten plastic at a location in order to form a portion of a part. Other additive processes use powders or granular material to produce parts. One class of additive manufacturing devices, selective laser melting (SLM) generally fuses fine metal powders together with a high power laser. One class of additive manufacturing devices, stereolithography (SLA) generally cures a photo-reactive resin with a UV laser or other radiation source.

Such devices may be used to create objects in remote or inhospitable environments such as outer space, aboard a naval vessel, underwater, rural areas and the like.

Additive manufacturing devices are typically initialized by an on-site user and closely monitored during operation in order to pause or terminate a build should issues arise. This hampers the ability of the device to be remotely operated.

Further, additive manufacturing devices typically have multiple computing devices which must interface in order to carry out a print and each computing device generally generates different command sets, creating a one way, iterative path for commanding the device.

Given the foregoing, systems and methods for facilitating safe remote operate of additive manufacturing devices are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing systems and methods which enable remote operations of additive manufacturing devices via node-based communications. The remote printer need not be in constant communication with the computer which originates the commands. Furthermore, each node in the communications path can terminate or pause the operation of the remote additive manufacturing device based on user input or the detection of a fault.

Among other features and advantages, systems and methods in accordance with the present disclosure enable operation of an additive manufacturing device without the supervision or involvement of an on-site human operator. Such systems and methods also enable remote production of parts that would be useful to on-site individuals, such as repair parts, tools, and the like, thereby enabling "tele-manufacturing."

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to systems, methods and computer program products which facilitate operation of remotely located additive manufacturing devices. Remotely located additive manufacturing devices may be located a significant distance from an operator. Remote locations include but are not limited to outer space, aboard a naval vessel, underwater, rural areas and the like.

In an aspect, a remote additive manufacturing device is operated via commands input at a first computing device. The first computing device is one of multiple nodes which pass the input commands from one node to another until they reach the remote additive manufacturing device. At each node, several operations are performed in order to ensure command integrity, safe operation, including running checks (e.g., a checksum) on the received files and commands to ensure file integrity and affirmatively confirming with the previous node that the right command was received.

Each node may be equipped with the same control software. The control software is able to, among other things, initialize a connected additive manufacturing device, evaluate the operational status of a connected additive manufacturing device, directly operate a connected additive manufacturing device, receive and send commands and other data to and from other nodes, pause or terminate the operation of a remote printer (whether controlled directly or indirectly).

During operation, the additive manufacturing device is monitored by one or more nodes having the control software installed thereon. Monitoring is performed via sensors which gather data from the additive manufacturing device. Sensors may be installed within the additive manufacturing device or positioned outside the additive manufacturing device. The control software contains operations protocols. Such operations protocols may be global operations protocols or operations protocols supplied via an operator at the current or a remote node. Operations protocols may govern initialization, printing, and post-printing actions. Such protocols may pause or terminate the actions of the additive manufacturing device at any stage of operation. Operations protocols may also direct remote nodes to terminate the operation of an additive manufacturing device (e.g., when the remote node has not received a communication from the node operating the additive manufacturing device for a preset amount of time).

Each node may have the IP address of the next node and include in the command a destination printer address. In other aspects, each node has the IP address of all the nodes. In such aspects, commands are sent with the remote printer's IP address included, thereby indicating that the commands should only be executed by the remote printer with the designated IP address.

Figure 1:
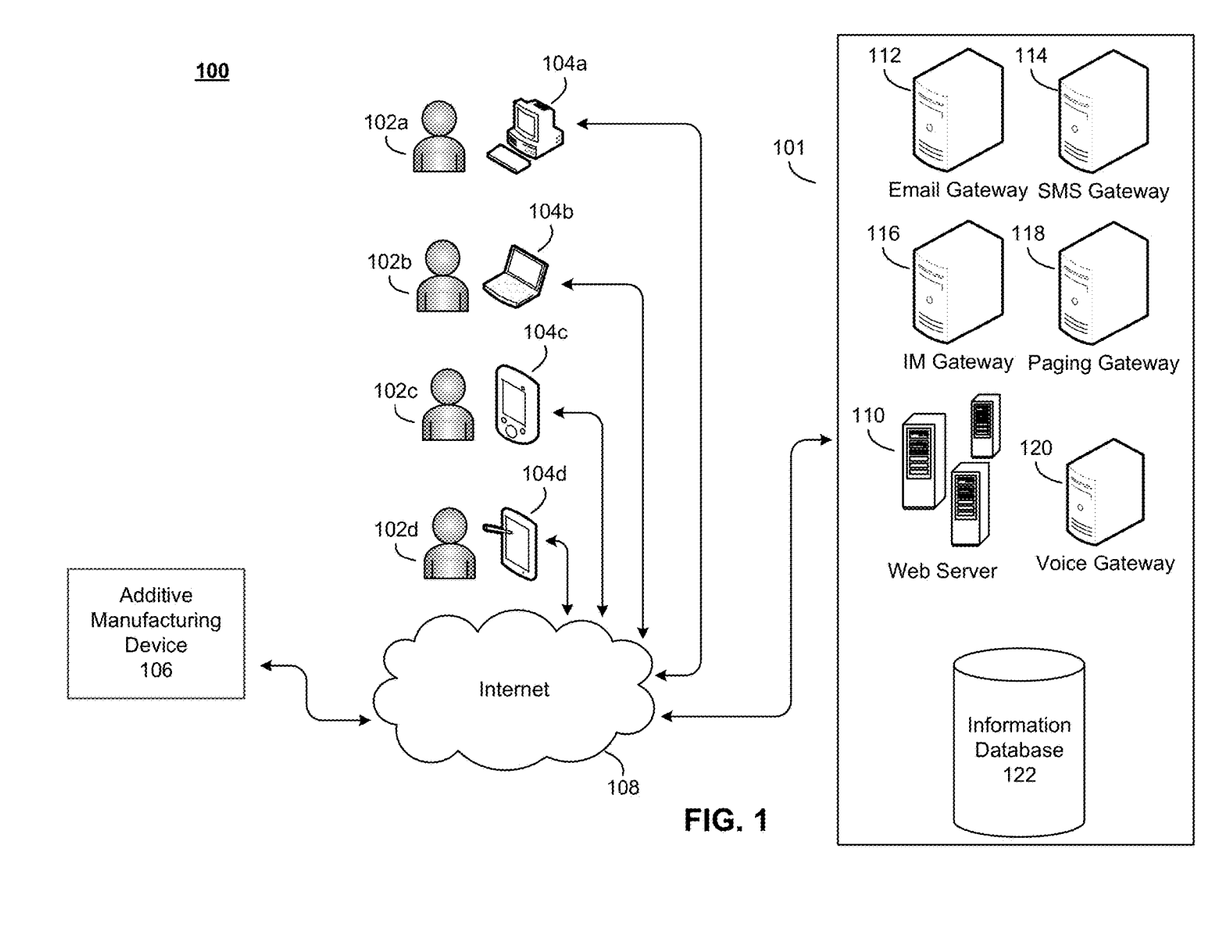
FIG. 1 is a block diagram of an exemplary system for facilitating additive manufacturing, according to an aspect of the present disclosure.

Referring now to FIG. 1, a block diagram of an exemplary system 100 for facilitating remote additive manufacturing, according to an aspect of the present disclosure, is shown. System 100 depicts operation of remote additive manufacturing device 106 via multiple nodes. In this instance the nodes are computing devices and infrastructure 101 each interconnected via Internet 108.

Additive manufacturing device 106 in accordance with the present disclosure may receive instructions that originate via a connected computing device 104, including devices connected via an ad hoc network of computing devices 104, via a network, via a third party application service provider infrastructure 101, or any other means apparent to those skilled in the relevant art(s) after reading the description herein. Connection may be a constant communicative connection, an intermittent connection, a periodic connection, or the like. Additive manufacturing device 106 may be located near an operator, or in a remote location. Likewise, information about the additive manufacturing device 106 may be transmitted to individuals (including remote operators) 102 via Internet 108. Cloud-based, Internet-enabled device communication system 100 includes one or more individuals 102 (shown as individuals 102*a-d* in FIG. 1) accessing—via a computing device 104 (shown as respective computing devices 104*a-h* in FIG. 1) and a network 108, such as the global, public Internet—an application service provider's cloud-based, Internet-enabled infrastructure 101. In various aspects, computing device 104 may be configured as: a desktop computer 104*a*; a laptop computer 104*b*; a Personal Digital Assistant (PDA) or mobile telephone 104*d*; a tablet or mobile computer 104*d*; any commercially-available intelligent communications device; or the like. System 100 may further comprise printing devices such as inkjet, thermal, or laser printers (not shown in FIG. 1).

As shown in FIG. 1, in an aspect of the present disclosure, an application service provider's cloud-based, communications infrastructure 101 may include one or more web servers 110, an email gateway 112, an SMS gateway 114, an Instant Message (IM) gateway 116, a paging gateway 118, a voice gateway 120, and an information database 122. Information database 122 may be configured to store additive manufacturing device 106 related data, such as status, operation, power availability, feedstock availability, and the like. Database 122 may also be configured to store individual 102 information. Database 122 may further store commands for additive manufacturing apparatus 106, including build profiles and sequences of commands. Database 122 may be stored within each computing device 104, within device 106, or selections therefrom. Computing devices 104 may be containing within or portions of As will be appreciated by those skilled in the relevant art(s) after reading the description herein, in such an aspect, an application service provider—an individual person, business, or other entity—may allow access, on a free registration, paid subscriber and/or pay-per-use basis, to infrastructure 101 via one or more World-Wide Web (WWW) sites on the Internet 108. Thus, system 100 is scalable such that individuals 102 may utilize it to facilitate communication with one or more additive manufacturing apparatus 106.

As will also be appreciated by those skilled in the relevant art(s), in an aspect, various screens would be generated by server 110 in response to input from individuals over Internet 108. That is, in such an aspect, server 110 is a typical web server running a server application at a website which sends out webpages in response to Hypertext Transfer Protocol (HTTP) or Hypertext Transfer Protocol Secured (HTTPS) requests from remote browsers on various computing devices 104 being used by various individuals 102. Thus, server 110 is able to provide a GUI to individuals 102 of system 100 in the form of webpages. These webpages are sent to the PC, laptop, mobile device, PDA or the like device 104, and would result in the GUI being displayed.

As will be appreciated by those skilled in the relevant art(s) after reading the description herein, alternate aspects of the present disclosure may include providing a tool for facilitating communication with one or more additive manufacturing devices 106 as a stand-alone system (e.g., installed on one server PC) or as an enterprise system wherein all the components of infrastructure 100 are connected and communicate via an inter-corporate Wide Area Network (WAN) or Local Area Network (LAN). For example, in an aspect where individuals 102 are all personnel/employees of the same entity, the present disclosure may be implemented as a stand-alone system, rather than as a web service (i.e., Application Service Provider (ASP) model utilized by various users from different companies) as shown in FIG. 1.

As will also be appreciated by those skilled in the relevant art(s) after reading the description herein, alternate aspects of the present disclosure may include providing the tools for facilitating the communication with one or more additive manufacturing apparatus 106 via a browser pre-installed with an applet or a browser with a separately downloaded applet on such devices 104. That is, as will also be apparent to one skilled in the relevant art(s) after reading the description herein, the applet that facilitates the communication platform disclosed herein may be part of the "standard" browser that ships with computing device 104 or may be later added to an existing browser as part of an "add-on" "application" or "plug-in."

In some aspects, each computing device 104 and infrastructure includes instances of the same control software.

Figure 2:
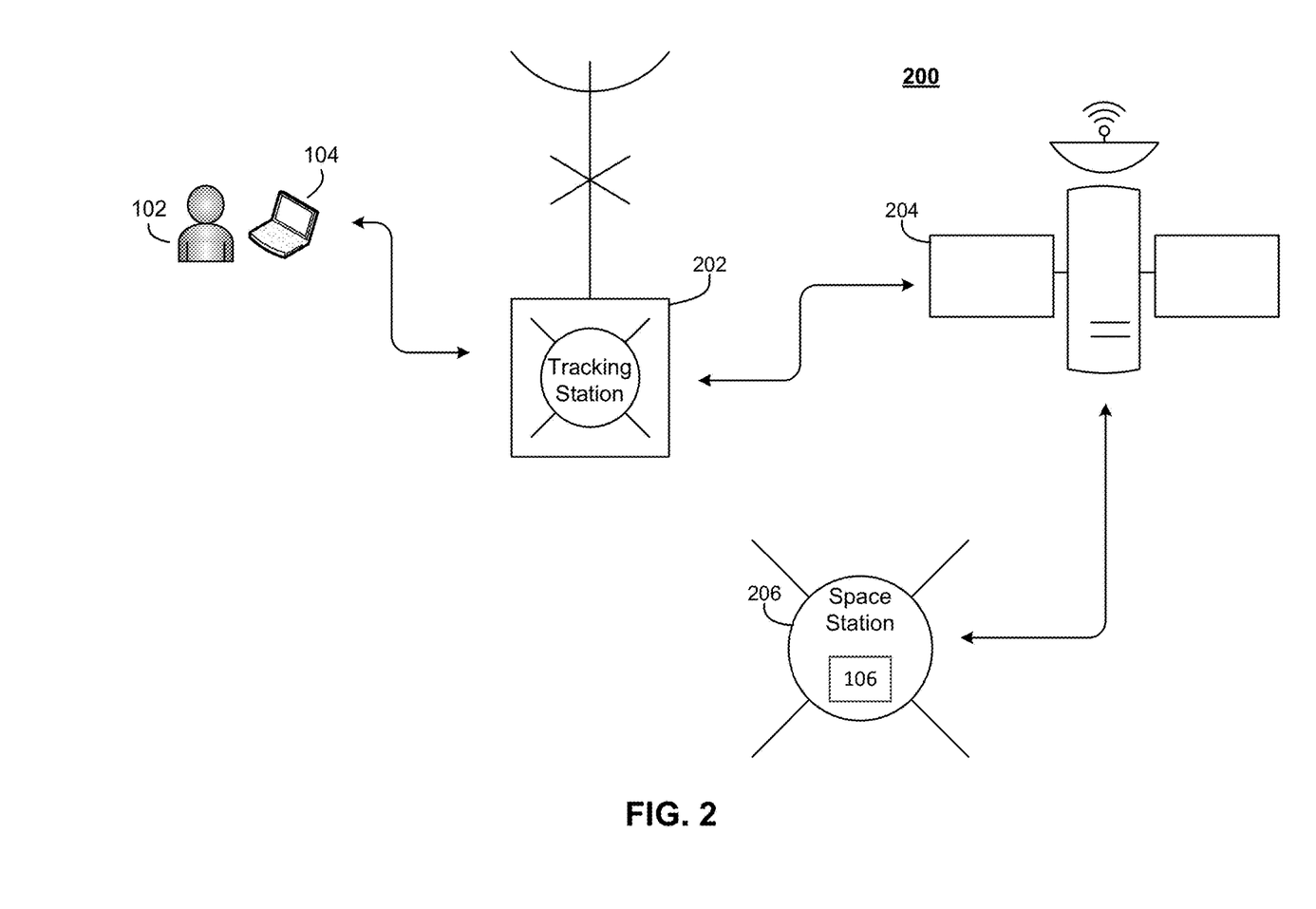
FIG. 2 is a dataflow diagram depicting remote operation of an additive manufacturing device located on a space station, according to an aspect of the present disclosure.

Referring now to FIG. 2, a dataflow diagram 200 depicting remote operation of additive manufacturing device 106 located on a space station 206, according to an aspect of the present disclosure, is shown.

Diagram 200 shows an exemplary communications path for providing print commands and other directives to a remote additive manufacturing device 106. In FIG. 2, device 106 is positioned on a space station 206. As will be apparent to those skilled in the relevant art(s) after reading the description herein, device 106 may be positioned at any desire location and nodes may be omitted or substituted as needed. The communications path includes multiple nodes, each of which include standard control software. The communications path includes a first node (computing device 104), a second node (a tracking station 202), a third node (a satellite 204), and a fourth node (a computing device housed within device 106 on space station 206).

There are a minimum of two computers in the communication path between the commanding computing device 104 and the remote additive manufacturing device 106. The additive manufacturing device 106 itself may house one of the computers. Each computer contains programming necessary to command and control the remote device 106. Each computing device 104 or "node" accepts and transmits the same kinds of data and commands. In this manner, the system has unified commanding.

In some aspects, the system is tolerant of a node in mid-path disconnecting or providing only a portion of the build file. Each node doesn't require any other node in order to operate once instructions are received. Each node listens for commands if they come in and send if there is another node available. Furthermore, nodes do not have to send to the same node each time.

Figure 3:
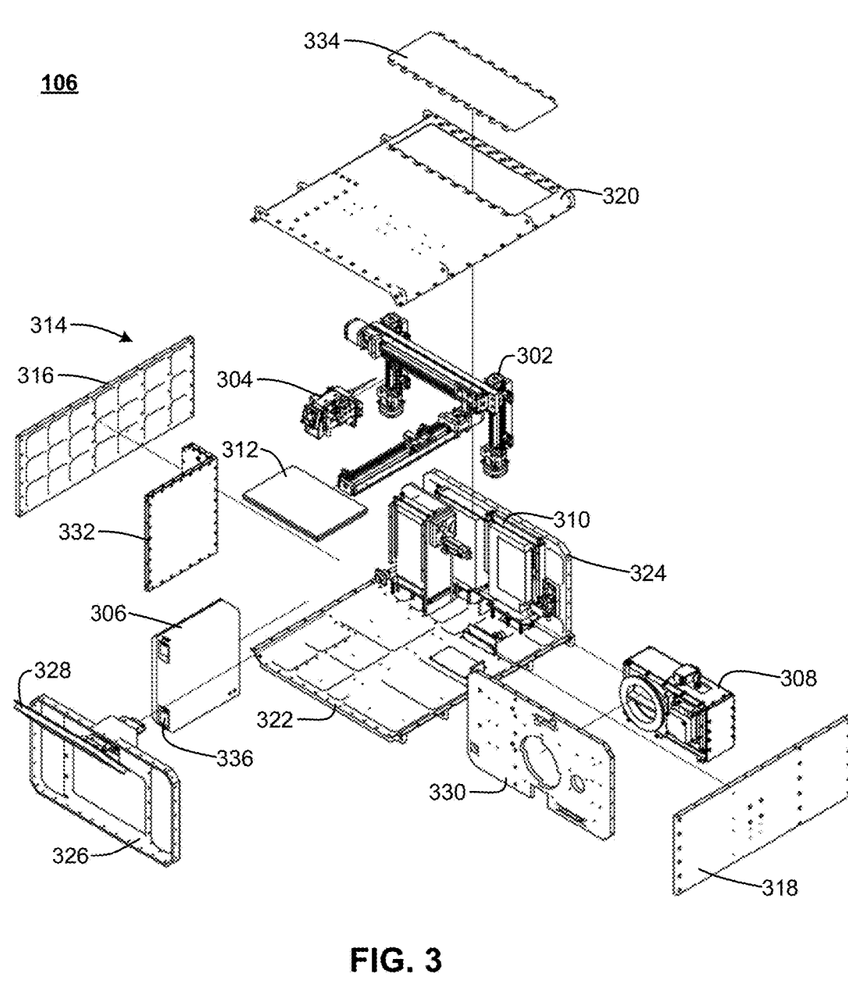
FIG. 3 is an exploded perspective view of an additive manufacturing device operable with remote operations systems described herein, according to aspects of the present disclosure.
Figure 4:
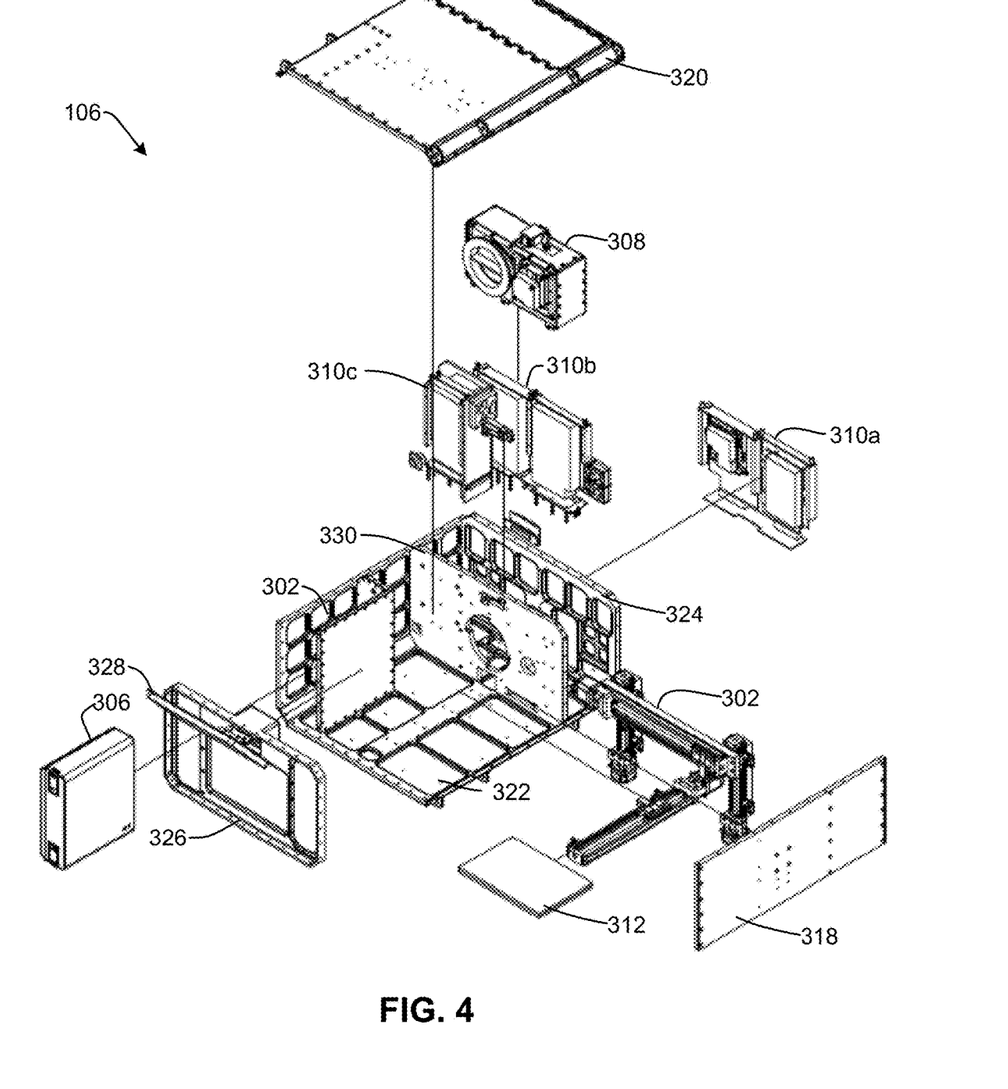
FIG. 4 is an exploded perspective view of the additive manufacturing device shown in FIG. 3.
Figure 5:
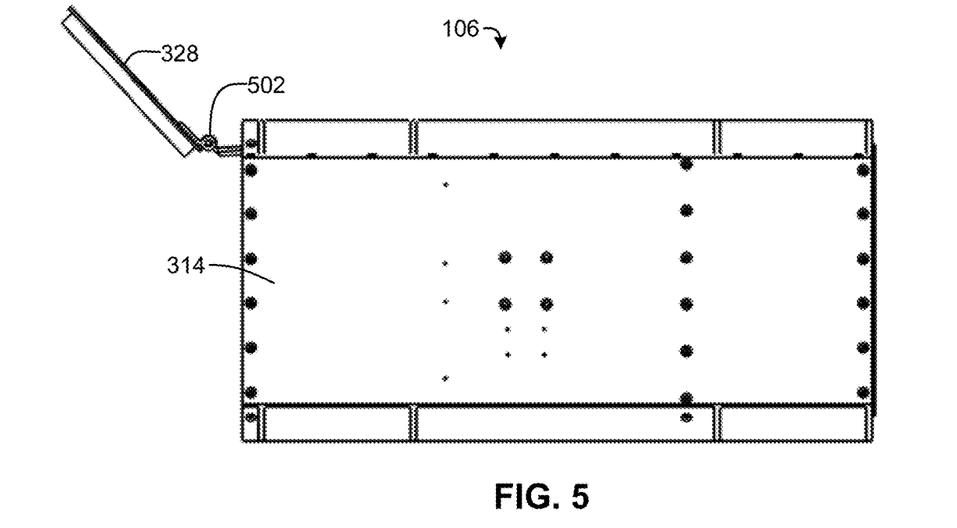
FIG. 5 is a side view of the additive manufacturing device of FIG. 3.
Figure 6:
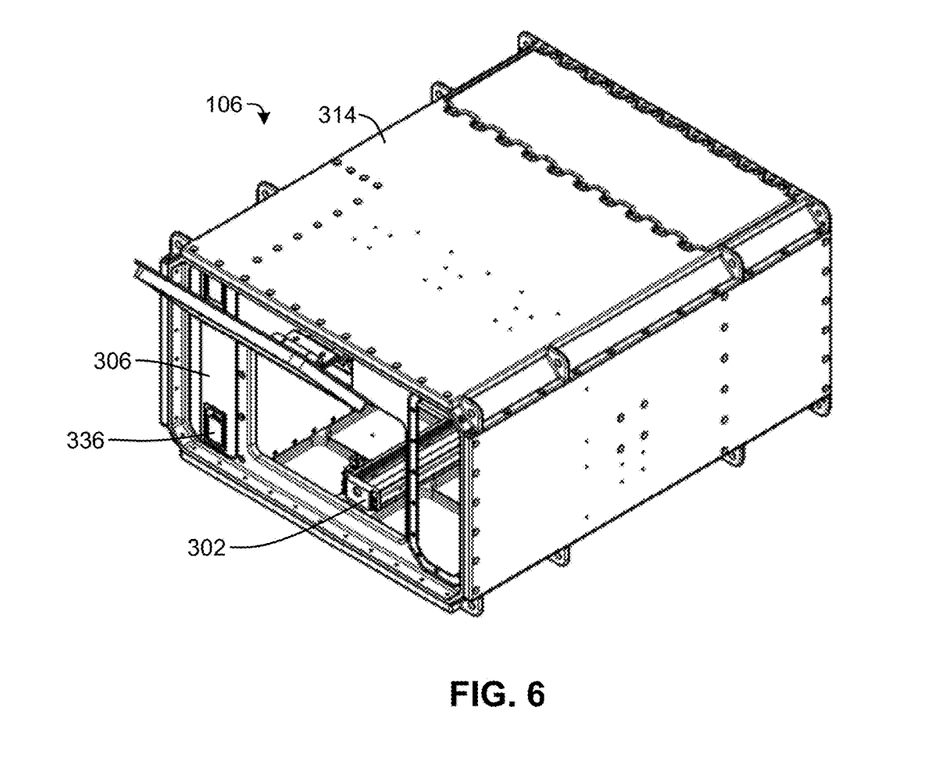
FIG. 6 is a perspective view of the additive manufacturing device of FIG. 3.
Figure 7:
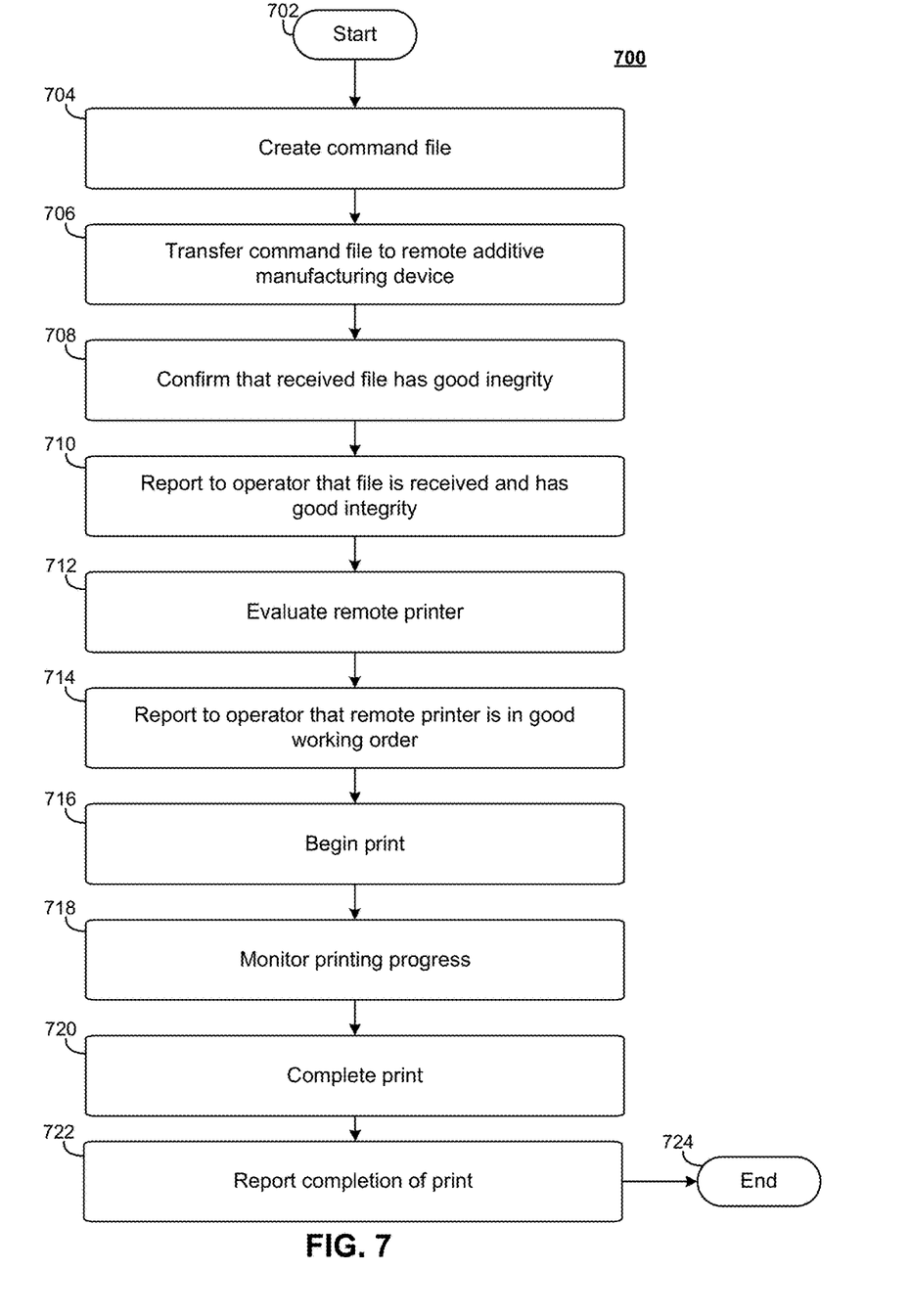
FIG. 7 is a flowchart depicting an exemplary process for producing a part via a remote additive manufacturing device, according to aspects of the present disclosure.

Referring now to FIGS. 3-6, various views of an exemplary additive manufacturing device 106 operable with remote operations systems described herein, according to aspects of the present disclosure, are shown. FIGS. 4 and 5 show exploded views of device 106. FIGS. 6 and 7 show side views and perspective views, respectively, of an assembled device 106. As will be apparent to those skilled in the relevant art(s) after reading the description herein, a variety of types of additive manufacturing devices 106 may be utilized herein, including photopolymer-based additive manufacturing devices, laser sintering devices, laminating object manufacturing devices, selective laser melting, selective laser sintering, electron beam freeform fabrication, and the like.

In an aspect, additive manufacturing device 106 is configured to produce parts using filament or other feedstock source, including feedstock made from the materials mentioned above. In various aspects, additive manufacturing device 106 is configured to produce parts in outer space, aboard a marine vessel, underwater and remote environments. Device 106 is operable on a spacecraft, on a satellite, on a suborbital vehicle and the like.

In an aspect, additive manufacturing device 106 comprises a traverse system 302, an extruder 304, a feedstock source 306, an environmental control unit (ECU) 308, control electronics and power supply 310 (labeled as control electronics 310a-c in FIG. 4), a build platform assembly 312 and a frame 314. In some aspects, one or more components are omitted. For example, internal control electronics 310 may be omitted in favor of control signals being provided by an on-site or off-site computing device. Device 106 may comprise a data connection such as a wireless communications module, an Ethernet connection, a USB connection, or the like which is communicatively connected to other portions of device 106 in order to facilitate communication with off-site or on-site computing devices. In some aspects, off-site or on-site computing devices provide some instructions and control (e.g., part creation plans), thereby augmenting the operations carried out by control electronics 310.

In some aspects, device 106 includes one or more sensors which monitor the functionality of device 106 and/or portions of device 106, monitor device 106 surroundings, and/or monitor other aspects apparent to those skilled in the relevant art(s) after reading the description herein. Sensors may include, but are not limited to: collision sensors, absolute position sensors, relative position sensors, range finders, light meters, Geiger counters, particle detectors, air flow meters, vibration sensors, accelerometers, humidity sensors, gas sensors, barometers, level sensors, load cells, temperature sensors, and any other sensor or measuring device apparent to those skilled in the relevant art(s) after reading the description herein. Video cameras which relay live video or images, or delayed images and/or video may also be included.

Parts, or portions of parts, may be created within a build volume according to part creation instructions. Additive manufacturing device 106 creates a desired part via feedstock. Feedstock may include any material or combination of materials which device 106 may be adapted to produce parts from in an iterative fashion. Additive manufacturing creates parts from feedstock by bonding or otherwise connecting small portions of feedstock together, the features of the created part being significantly smaller than the overall volume of feedstock used.

ECU 308 may be omitted in some aspects. Where device 106 does not comprise ECU 308, other environmental control systems may be adapted to filter, regulate and control the environment in and/or around device 106.

Traverse system 302 includes multiple screw driven linear actuators or other precision linear motion devices. An extruder group of linear actuators is connected to extruder 304, positioning extruder 304 in two axes. A build platform assembly actuator controls the position of the build platform assembly 312 is a third axis. The third axis may be parallel to an axis extruder 304 moves in or it may be orthogonal to extruder 304 movement axes. Traverse system 302 may be mounted to plate 330, providing a common anchor point. Each linear actuator or other motion device of traverse system 302 is rigidly and precisely connected to portions of frame 314, thereby providing reference points for movement and placement of extruder 304 and build platform assembly 312 in microgravity, aquatic, and other environments. Traverse system 302 is one form of a material deposition position system useful for implementing aspects of the present disclosure.

Filament extruder 304 is adapted to create a desired part on build platform assembly 312 via deposition of a polymer or other material. Extruder 304 is connected to portions of traverse system 302 and movable in, for example, two axes (e.g., x- and y-axes). Deposition may be done in an additive manner, such as a layer-wise or raster pattern. The positions of filament extruder 304 and build platform assembly 312 during construction may be controlled by control electronics 310, electrically connected to portions of traverse system 302. Control electronics 310 are also electrically connected to extruder 304, thereby controlling the flow and deposition of filament. Control electronics 310 may be software, hardware, or a combination of software and hardware. Control electronics 310 are configured to cause the desired part (e.g., a support structure) to be produced by additive manufacturing device 306. Control electronics 310 may house control software described herein. Control electronics 310 may include a power supply 310c housed within enclosure 314, thereby creating a modular device 106. In other aspects, the power supply is omitted and device 106 draws power from an external source, such as station power, grid power, ships mains, and the like. In yet other aspects, an external power supply is provided. Extruder 134 is one form of a material deposition component useful for implementing aspects of the present disclosure.

Control electronics 310 may include redundant systems. Redundancy may be desired when deploying device 106 in a space environment due to the negative effects of radiation on sensitive electronics. Redundancy allows high-speed, non-radiation hardened electronics to be used, rather than radiation hardened equipment. Such high-speed electronics enable faster computations and greater functionality compared to radiation-hardened equipment. Redundant systems are also useful in aquatic environments, high-vibration environments and the like. Redundant systems may run computations in parallel and "check each other." Such systems may also provide fail-over support. That is, if the primary system fails, secondary and other backup systems take over.

Extruder 304 is connected to a feedstock source 306. Feedstock source 306 houses and supplies material necessary to produce one or more parts via additive manufacturing device 306. In an aspect, feedstock source 306 is a removable assembly containing a spool of polymer filament threaded into filament extruder 306 at a front portion of extruder 304 thereby reducing the area occupied by filament within enclosure 314 and increasing the available build volume. Extruder 304 is configured to heat the polymer filament to its melting point and deposit the melted polymer in order to form the desired part. In another aspect, a spool of filament or other feedstock source 306 is integrated into device 306. Feedstock source 306 may include a motor or other device configured to actively feed out or otherwise supply filament.

Environmental control unit 308 is configured to regulate the environment of additive manufacturing device 106. In an aspect, environmental control unit 308 comprises at least one fan, a temperature regulation device (e.g., a heater, an air conditioning unit), and a filter. Environmental control unit 308 regulates one or more of: temperature, humidity, air circulation and air quality within additive manufacturing device 106, thereby preventing outgassing and contamination of the environment in which additive manufacturing device 106 is located during operation. Environmental control unit 308 may also include sensors which measure concentrations of harmful gases or other materials or environmental factors which would be dangerous to release from within enclosure 314. In this manner, ECU 308 may monitor and protect individuals and equipment in tight quarters with device 106 (e.g., on a space station, on a marine vessel, in a laboratory) from potentially harmful outgassing if enclosure 314 is opened before ECU 308 eliminates or captures such gases or materials. ECU 308 is connected with control electronics 310. Control electronics 310 operates ECU 308, facilitating regulation of temperature, humidity, air quality, air circulation and the like. In some aspects enclosure 314 includes a door 328 controllable by control electronics 310. Door 328 may not be opened until ECU 308 determines that, utilizing sensors and/or operating parameters (e.g., run time, wait time, contaminant concentration level thresholds, and the like) the enclosed environment will not contaminate the outside environment.

Build platform assembly 312 may be one or more components configured to hold and position a part being constructed by device 306. A build surface of build platform assembly 312 is positionable relative to extruder 304. For example build platform assembly 312 may be positionable in a third axis (e.g., the z-axis) via a portion of traverse system 302. In other aspects, build platform assembly 312 remains static and extruder 304 moves during creation of the part. In another aspect, build platform assembly 312 is omitted. In various aspects, build platform assembly 312 comprises a self-leveling print tray (not shown in FIG. 3), designed to save time and automate initialization of device 106. In some aspects, device 106 includes an optical sensor or other sensing device which measures the print tray and small piezoelectric motors connected to the print tray adjust the leveling accordingly. Adjustment may occur before, during and after part creation.

Enclosure 314 provides a closed environment for the build volume of device 106. In some aspects, device 106 is self-contained and enclosure 314 contains all portions of device. Enclosure 314 may have a metal construction and be configured to be electromagnetically isolated from the surrounding environment. In this manner, device 106 will not produce potentially harmful interference with communications equipment, laboratory instruments, other computing devices and the like. In other aspects, portions of enclosure 314 are constructed of plastic or other materials and/or may be produced by device 106 from feedstock provided. Via enclosure 314, device 106 may be mounted or otherwise connected to other objects such as an experiment bay, the deck or wall of a compartment and the like. The exterior of enclosure 314 may be formed by a baseplate 322, a back plate 324, a first side plate 316, a second side plate 318, a top plate 320 having an access panel and a front plate 326 having a door 328. The interior of enclosure 314 may include a partition 330 which separates the build volume, traverse assembly 302, build platform assembly 312 and extruder 304 from a rear section containing control electronics 310 and ECU 308. Partition 330 contains an opening which the filter access of ECU interlocks with, allowing access to ECU 308 filters from within the build volume. In this manner, a user may easily service ECU 308 without removing device 106 from its mounting location. Traverse system 302 is also mounted to partition 330, providing a stabilizing common surface. The interior of enclosure 314 may also include wall 332. Wall 332 is positioned at a front corner portion of enclosure and forms a feedstock cartridge receptacle 302. Receptacle 202 receives feedstock cartridge 106 via an opening in front plate 126. Receptacle 202 may include latches, catches or other retaining means for retaining cartridge 106. Door 128 allows the user to access the build area in order to remove completed parts, perform maintenance and the like. Door 128 may have a window. In some aspects, the window is an EMI shielded window. Door 128 may be connected to front plate 126 via a hinge 502. Hinge 502 may be motorized and/or controlled by control electronics 310.

Enclosure 314 may be configured to withstand and insulate internal components from shocks and other external forces (e.g., launch forces, forces encountered at sea, high g-forces, and the like). Enclosure 314 may be configured to electromagnetically isolate device 106 from the surrounding environment, thereby ensuring that EMI produced by the surrounding environment does not affect device 106 and vice versa.

In some aspects, device 106 does not include enclosure 314. For example device 106 may be attached to an end of a robotic arm and used to produce parts at various locations on the exterior of a spacecraft, space station, satellites, or the like. As will be apparent to those skilling in the relevant art(s) after reading the description herein, the robotic arm or other material bonding positioning system may or may not be a part of the object where the part is being created, thereby enabling repair, construction or the like of other devices.

In some aspects, device 106 includes one or more cameras to monitor part production, component functioning or the like. Device 106 may include multiple temperature sensors within enclosure 314.

Referring now to FIG. 7, a flowchart depicting an exemplary process 700 for producing a part via remote additive manufacturing device 106, according to aspects of the present disclosure, is shown.

Process 700 may be carried out using a plurality of nodes each having control software loaded thereon. Control software is described in greater detail with reference to FIG. 9. FIGS. 1 and 2 depict examples of communications paths including such nodes.

Process 700 begins at step 702 with control immediately passing to step 704.

At step 704, a command file is initially created. The command file includes a remote additive manufacturing device designation, part creation instructions, and, optionally, command file operations protocols. Part creation instructions may include g-code or other commands for creating a part via device 106.

At step 706, the command file is transferred, via nodes, to a node coupled to the destination additive manufacturing device 106. In an aspect, the command file and/or other commands are supplied to a first node. Such inputs are sent to the next node and executed as if the inputs were directly entered into that node. Control software contains a manager program that is capable of causing other programs and protocols to activate.

At step 708, the receiving node confirms that the command file received has good integrity. In an aspect, confirmation is carried out via running a check sum on the data received. Check sums may be run at each node. When a node receives a file or command it interrogates the data and confirms quality. If the file is quality, it returns a check sum to all nodes. Only the node which originates the file/command knows what it means. In this manner, the commanding node gets confirmation of device 106 receipt of the file/command.

At step 710, if the incorrect checksum is received, the originating node may return a kill or pause command. Similarly, other nodes may send kill or pause commands in response to receipt of out of order information, including failure to receive information. In another aspect, the receiving node mat return a "file is good" indicator to all nodes or it may send a "file is good" indicator to the originating node.

In various aspects, each node utilizes the same commands, creating a central set of commands which are origination agnostic.

At step 712, the remote additive manufacturing device 106 is evaluated to ensure that it may create the desired part specified in the part creation instructions contained in the command file. Various checks and initializing steps may be taken. For example, control software may first determine if additive manufacturing device 106 is in use. Control software may determine if device 106 is powered. Where the device is already in use, control software may queue commands, thereby allowing device 106 to perform multiple commands (e.g., print multiple parts) without on-site human intervention. Overriding commands may be sent which are immediately performed, rather than queued (e.g., a kill power command).

Evaluation may be performed according to initialization protocols contained within the control software, contained within the command file, or both. The command file may contain device 106 specific or environment specific initialization instructions. For example, in power-limited environments, device 106 may be turned on or otherwise readied for operations in segments in order to avoid an over voltage situation.

At step 714, the node connected to device 106 has evaluated device 106 and determined it is in good working order. This status is reported to the originating node.

At step 716, part creation begins.

At step 718, printing progress is monitored throughout the printing process. Periodically, monitoring reports may be sent to other nodes. Logs of printing progress may be created and transmitted. In some aspects, digests of logs are transmitted, while more detailed logs are stored on-site.

The print successfully completes at step 720 and is reported at step 722. Process 700 then terminates at step 724.

Figure 8:
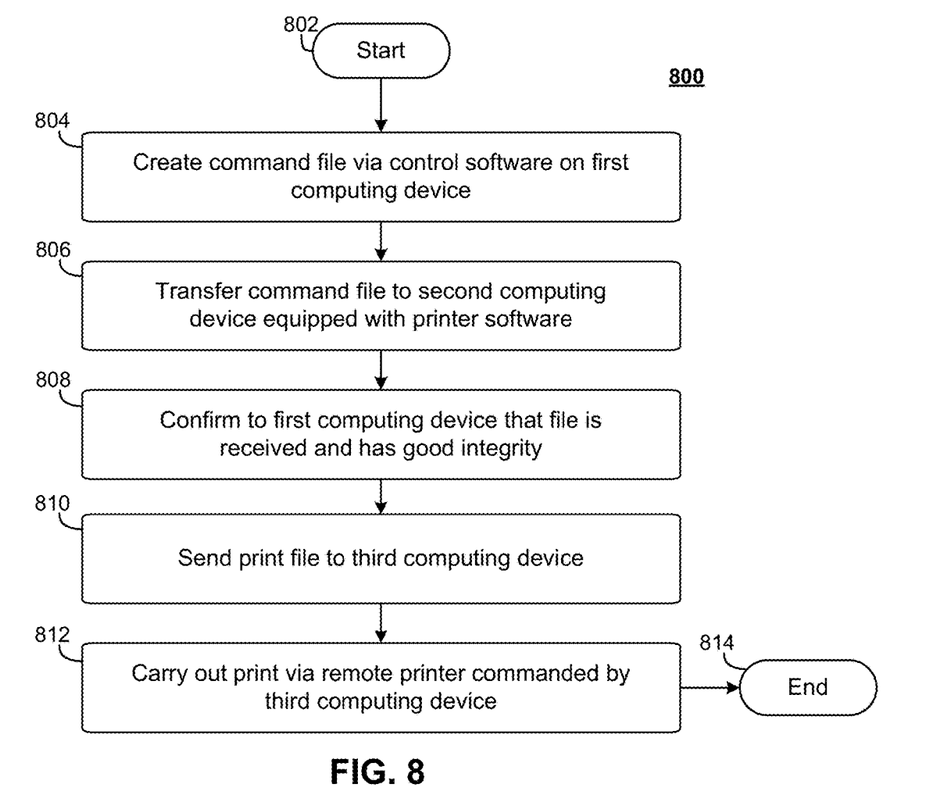
FIG. 8 is a flowchart depicting an exemplary process for producing a part via a remote additive manufacturing device, according to aspects of the present disclosure.

Referring now to FIG. 8, a flowchart depicting an exemplary process 800 for producing a part via remote additive manufacturing device 106, according to aspects of the present disclosure, is shown.

Process 800 utilizes a three node system to carry out a command, namely a part creation command. Process 800 begins at step 802 with control immediately passing to step 804.

At step 804, a command file is creating which includes part creation instructions. The command file is created on a first computing device 104.

At step 806, the command file is sent to a second computing device 104, that is to the second node.

At step 808, the second computing device 104 confirms to the first computing device 104 that the file was received and has good integrity.

At step 810, the second computing device 104 sends the file to the third computing device 104/node. The third computing device 104 is communicatively connected to additive manufacturing device 106.

After confirming the received file has good integrity, the third computing device 104 and additive manufacturing device 106 step 812 executes and the part is created. Process 800 then terminates at step 814.

Figure 9:
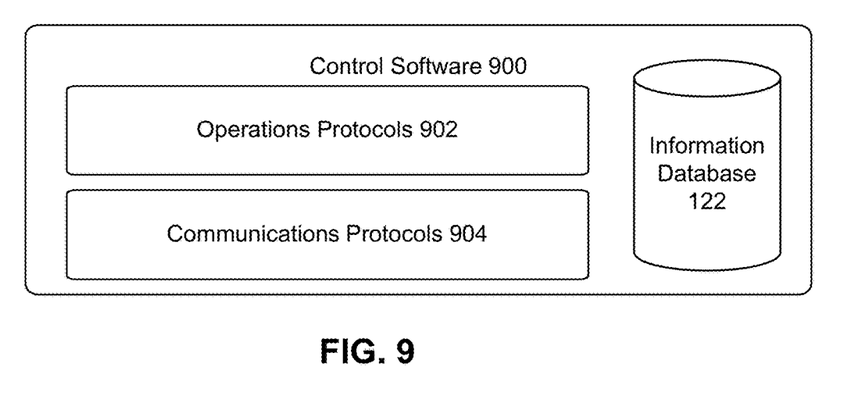
FIG. 9 is a block diagram of exemplary control software configured to facilitate operations of one or more remote additive manufacturing devices, according to aspects of the present disclosure.

Referring now to FIG. 9, a block diagram of exemplary control software 900 configured to facilitate operations of one or more remote additive manufacturing devices 106, according to aspects of the present disclosure, is shown.

Each node may be loaded with control software 900. Control software 900 receives and send unified commands and communications. Control software 900 includes operations protocols 902, communications protocols 904 and an information database 122. Logs indicating commands sent and received, responses to such commands, device 106 performance, and the like are stored in database 122, thereby creating redundant logs throughout a communications path. Such redundancy facilitates performance tracking and determination of failures.

Operations protocols 902 include command lists, protocols necessary to carry out received commands, monitoring protocols (including pre-operation, during-operation, and post-operation monitoring), and the like. For example, a default operations protocol may be that a received command is carried out as long as device 106 stays in contact with the originating node. In some aspects, such a protocol may be overridden via another command or by operations protocols accompanying a command file.

Operations protocols 902 may allow both individuals and control software 900 at any node to terminate or pause all operations. Operations protocols 902 determine what sensors are used to monitor device 106, the rate of monitoring and logging and to control the environment of device 106. Operations protocols 902 may contain operations constraints or envelopes (e.g., temperature limits, power limits, timing limits).

An exemplary operations protocol first verifies the integrity of, for example, a command file containing a build command. Next, the part creation instructions are moved line by line on to the memory of device 106. Subsequently, a check sum is run in order to ensure that device 106 was loaded with the correct file. Then device 106 is commanded to print.

Operations protocols 902 may contain initialization protocols. An exemplary initialization protocol may include commands to home all axes, turn on appropriate fans, set lighting, set all temps (heat/cool build volume), center extruder 304, measure fan speed, currents that are going to sensors/fans/elements, ensure that power and electronics systems area heated and operating before running, and check and see if all voltages fall within proper ranges.

In some aspects, control software 900 detects the orientation of build platform 312 via, for example, optical sensors. Control software 900 then determines the real world orientation of build platform 312 and adjusts part creation instructions to account for an out-of-level build platform. In some aspects, four measurements are taken to determine build platform 312 orientation. For example, if supplied g-code dictates that extruder 304 is creating layer 15 at a height of 12 mm in a corner area of build platform 312, but that corner was measures 0.1 mm below normal, control software 900 may adjust the height by 0.1 mm.

In some aspects, control software 900 may include an authorization protocol which limits where commands may originate from. For example, the authorization protocol may allow commands from only authorized nodes, such as a ground-based node controlled my mission controllers in the case of a space-based device 106, or commands from a government controlled node, in the case of a naval vessel-based device 106.

Communications protocols 904 determine where information is sent, what information is stored at a node and how often information is sent and/or stored.

Figure 10:
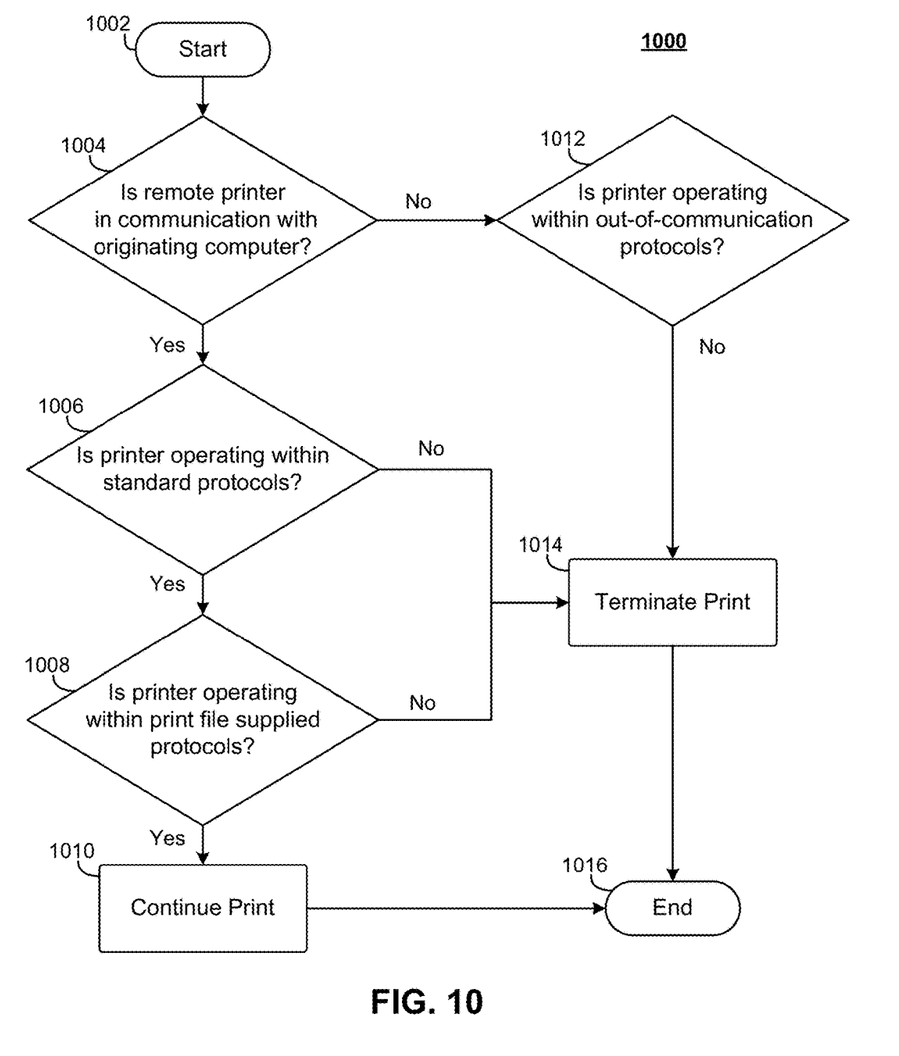
FIG. 10 is a flowchart depicting an exemplary process for monitoring and commanding remote additive manufacturing device operations, according to aspects of the present disclosure.

Referring now to FIG. 10, a flowchart depicting an exemplary process 1000 for monitoring and commanding remote additive manufacturing device 106 operations, according to aspects of the present disclosure, is shown.

Process 1000 is an exemplary operations protocol 902 and may be periodically run during a part creation process. Alternatively, process 1000 may be initiated when an even occurs, such as loss of communications, print startup, print pause, or the like. Process 1000 begins at step 1002 with control immediately passing to step 1004.

At step 1004, control software 900 determines if device 106 is in communication with the originating node. If it is not, step 1012 executes. At step 1012, out-of-communication protocols are checked. If such protocols are not being complied with, step 1014 executes and the print is paused or terminated.

If device 106 is communicating with the originating node, step 1006 executes and control software 900 determines if device 106 is operating within standard operations protocols 902. If device 106 is not, the print is terminated or paused at step 1014.

If device 106 is operating within standard operating protocols 902, step 1008 executes and control software 900 determines if device 106 is operating within command file-supplied protocols. If device 106 is not, the print is terminated or paused at step 1014.

If device 106 is operating within command-file supplied protocols, step 1010 executes, continuing the print. Process 1000 terminates at step 1016 due to the pausing/termination of the print at step 1014 or continuing the print at step 1010.

Figure 11:
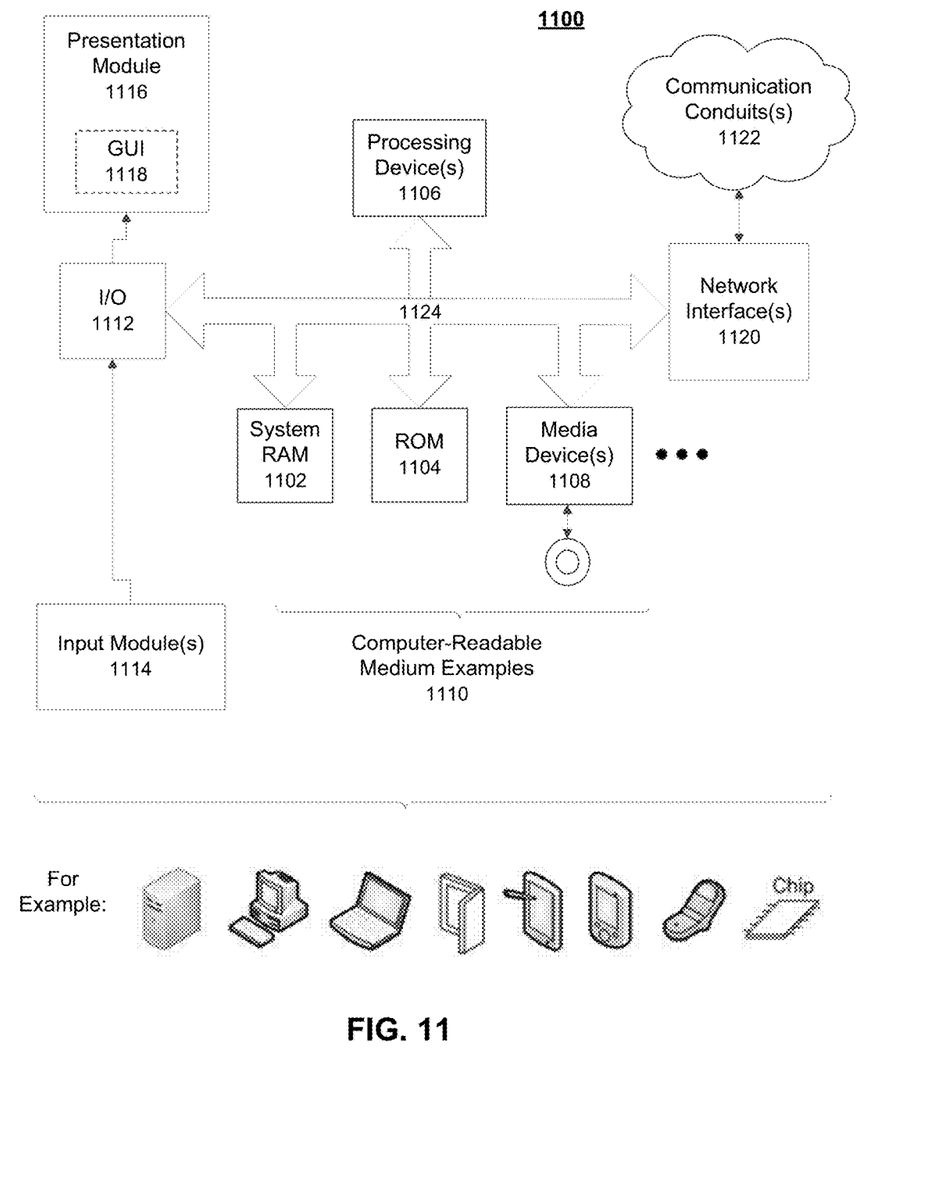
FIG. 11 is a block diagram of an exemplary computing system useful for implementing various aspects of the present disclosure.

Referring now to FIG. 11, a block diagram illustrating an exemplary computer system 1100 useful for implementing an aspect of the present disclosure, is shown.

FIG. 11 sets forth an illustrative computer system that may be used to implement computing functionality 1100, such as computing device 104, controlling electronics 310, and the like, which in all cases represents one or more physical and tangible processing mechanisms.

Computing functionality 1100 may comprise volatile and non-volatile memory, such as RAM 1102 and ROM 1104, as well as one or more processing devices 1106 (e.g., one or more central processing units (CPUs), one or more graphical processing units (GPUs), and the like). Computing functionality 1100 also optionally comprises various media devices 1108, such as a hard disk module, an optical disk module, and so forth. Computing functionality 1100 may perform various operations identified above when the processing device(s) 1106 execute(s) instructions that are maintained by memory (e.g., RAM 1102, ROM 1104, and the like).

More generally, instructions and other information may be stored on any computer readable medium 1110, including, but not limited to, static memory storage devices, magnetic storage devices, and optical storage devices. The term "computer readable medium" also encompasses plural storage devices. In all cases, computer readable medium 1110 represents some form of physical and tangible entity. By way of example, and not limitation, computer readable medium 1110 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1102, ROM 1104, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 1100 may also comprise an input/output module 1112 for receiving various inputs (via input modules 1114), and for providing various outputs (via one or more output modules). One particular output module mechanism may be a presentation module 1116 and an associated GUI 1118. Computing functionality 1100 may also include one or more network interfaces 1120 for exchanging data with other devices via one or more communication conduits 1122. In some embodiments, one or more communication buses 1124 communicatively couple the above-described components together.

Communication conduit(s) 1122 may be implemented in any manner (e.g., by a local area network, a wide area network (e.g., the Internet), and the like, or any combination thereof). Communication conduit(s) 1122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilizing additive manufacturing devices not mentioned herein, implementation within computing devices other than those disclosed herein, and operating in environments other than those disclosed herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A system for operating a remote additive manufacturing device, the system comprising:
   a remote additive manufacturing device located in a remote location arranged with at least one monitoring sensor to obtain operational data about the remote additive manufacturing device, an enclosure with a door to isolate an additive manufacturing process build area from an environment outside of the additive manufacturing device and an environmental control unit positioned within the remote additive manufacturing device to isolate contaminants created during an additive manufacturing process to create a part, the environmental control unit comprising a filter, a fan, at least one atmospheric sensor, and a temperature regulation device to delay access through the door to the build area until contaminant concentration levels are at an acceptable threshold as measured by the at least one atmospheric sensor;
   a command file, the command file including a remote additive manufacturing device designation, device action instructions, and command file operations protocols;
   a first node having a first instance of a control software installed thereon, the control software configured to receive, transmit, and execute the command file, the transmitting based on the remote additive manufacturing device designation, the first node receiving the command file;
   a second node having a second instance of the control software installed thereon, the second node located near and communicatively coupled to the remote additive manufacturing device designated by the remote additive manufacturing device designation, the second node receiving the command file via the first node, confirms integrity of the command file by performing a check sum on the data received from the first node prior to the remote additive manufacturing device operating and returning the check sum result to the first node and monitoring the data collected from the at least one sensor; and
   wherein the remote additive manufacturing device is remotely positioned relative to the first node; and
   wherein the control software further comprises operations protocols which facilitate initialization of part creation, termination of part creation and pause of part creation as commanded from either the first node or the second node without human interaction with the additive manufacturing device in response to at least one measurement taken by the at least one monitoring sensor and the at least one atmospheric sensor.

2. The system of claim 1, wherein the device action instructions are part creation instructions.

3. The system of claim 2, the part creation instructions comprising g-code, the remote additive manufacturing device designation comprising an IP address.

4. The system of claim 1, wherein the device action instructions are one of: a calibration command; a remote maintenance command; a remote activation command; and a remote deactivation command.

5. The system of claim 1, wherein the second node is positioned within the remote additive manufacturing device.

6. The system of claim 1, wherein the remote location is one of: a rural area; a space station; a spacecraft; and a naval vessel.

7. The system of claim 1, wherein the control software controls the operation of the environmental control unit in response to at least one measurement taken by the at least one monitoring sensor and the at least one atmospheric sensor.

8. The system of claim 7, the control software further comprising a log database, the control software storing operational and communication records in the log database.

9. The system of claim 8, wherein the operational and communication records are stored in the log database of each instance of the control software.

10. The system of claim 7, the remote additive manufacturing device further comprising a motorized locking door, the control software configured to measure contamination concentration within the remote additive manufacturing device via the at least one atmospheric sensor and unlock and open the door when the measured contamination concentration drops below a contamination threshold level.

11. The system of claim 1, wherein the command software includes operations protocols and communications protocols.

12. The system of claim 11, the remote additive manufacturing device comprising a self-leveling build tray controllable by the second node, wherein the operations protocol includes leveling the self-leveling build tray prior to part creation.

13. The system of claim 11, the control software including a kill command configured to, when input at any node, cease operation of the remote additive manufacturing device.

14. The system of claim 1, further comprising a plurality of additional nodes, the plurality of additional nodes communicatively coupled to the first node and the second node and transmitting the command file to the second node from the first node.

15. The system of claim 1, wherein the first node is located on earth and the remote additive manufacturing device is located in space.

16. The system of claim 1, the control software comprising a location database comprising IP addresses for each node and each remote additive manufacturing device.

17. A method of uploading a part creation file to a remote additive manufacturing device, the method comprising:
providing a remote additive manufacturing device arranged with at least one monitoring sensor at a remote location, an enclosure with a door to isolate an additive manufacturing process build area from an environment outside of the additive manufacturing device and an environmental control unit positioned within the remote additive manufacturing device to isolate contaminants created during an additive manufacturing process to create a part, the environmental control unit comprising a filter, a fan, at least one atmospheric sensor, and a temperature regulation device to delay access through the door to the build area until contaminant concentration levels are at an acceptable threshold as measured by the at least one atmospheric sensor;
creating a command file; and
uploading the command file at an originating node to a node network comprising a plurality of nodes;
wherein the remote additive manufacturing device is communicatively coupled to one of the plurality of nodes which is arranged to confirm integrity of the command file and communicating with the originating node a status of at least one of the integrity and data from the at least one monitoring sensor, at each node of the plurality of nodes each having an instant of control software installed thereon, the control software, at each node comprises operations protocols which facilitate initialization of and part creation, termination of part creation and pause of part creation as commanded from either any one node of the plurality of nodes without human interaction with the additive manufacturing device in response to at least one measurement taken by the at least one monitoring sensor and the at least one atmospheric sensor; and
wherein the command file includes a remote additive manufacturing device designation, device action instructions, and command file operations protocols.

18. The method of claim 17, wherein the remote additive manufacturing device is located in space.

19. The method of claim 17, wherein the command file is uploaded at a first node.

20. The method of claim 17, the method further comprising:
receiving command file receipt confirmation from the one of the plurality of nodes communicatively coupled to the remote additive manufacturing device.

21. The method of claim 1, the method further comprising:
issuing, via the originating node, a kill command to the remote additive manufacturing device.

* * * * *